United States Patent
Koeller

(12) 
(10) Patent No.: US 6,297,766 B1
(45) Date of Patent: Oct. 2, 2001

(54) PORTABLE WEATHER INDICATING DEVICE AND METHOD

(75) Inventor: Paul Douglas Koeller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,266

(22) Filed: Jan. 22, 1999

(51) Int. Cl.[7] .............................. G01S 13/95; H04B 7/185
(52) U.S. Cl. ..................... 342/357.06; 342/26; 342/175; 342/176; 342/357.01; 342/450; 342/451; 342/460; 702/2; 702/3
(58) Field of Search ................... 342/26, 357.01–357.17, 342/455, 460, 175–186, 195, 450, 451; 340/540, 968; 701/121; 702/2, 3

(56) References Cited

U.S. PATENT DOCUMENTS

| | | | |
|---|---|---|---|
| 3,668,403 | * | 6/1972 | Meilander .............................. 701/121 |
| 4,521,857 | * | 6/1985 | Reynolds, III ...................... 342/26 X |
| 5,493,309 | * | 2/1996 | Bjornholt ............................. 342/455 |
| 5,568,385 | | 10/1996 | Shelton . |
| 5,657,009 | * | 8/1997 | Gordon ................................. 340/968 |
| 5,717,589 | | 2/1998 | Thompson et al. . |
| 5,757,322 | * | 5/1998 | Ray et al. ............................. 342/460 |
| 5,963,130 | * | 10/1999 | Schlager et al. ...................... 340/540 |
| 6,064,337 | * | 5/2000 | Hirosawa ........................ 342/357.13 |

OTHER PUBLICATIONS

DTN Weather Center Brochure, Data Transmission Network Corporation, 6 pages (no date).
NOAAPORT Broadcast System Document, Doc. ID No. AWP.DSN.NPBRD–04.00 (Oct. 1, 1997).
NOAA Weather Radio Brochure (Mar. 1997).
"NOAAPORT User's Page," Document URL: http://www.nws.noaa.gov/noaaport/html/sat_loc.shtml, (last modified: Nov. 10, 1998).
"Radar Products & Publications," Document URL: http://www.ncdc.noaa.gov/ol/radar/radarproducts.html, (last modified: Nov. 17, 1997).
"UNISYS Weather Information," Document URL: http://www.ncdc.noaa.gov/ol/radar/radarproductssoftwareunisys.html, (last modified: Sep. 14, 1997).
"Direct Satellite Readout Systems," Document URL: http://sdcd.gsfc.nasa.gov/ISTO/dro/dro_intro.html, (printed Nov. 10, 1998).
Internet Weather Links, 1 page (no date).
"A Change in the Weather Service" Brochure by U.S. Department of Commerce, National Oceanic and Atmospheric Administration, Nov., 1993.

* cited by examiner

Primary Examiner—Bernarr E. Gregory
(74) Attorney, Agent, or Firm—Martin & Associates, L.L.C.; Derek P. Martin

(57) ABSTRACT

A portable weather indicating device includes a housing with a display that can be carried by a user during hiking, biking, or other activities. A communication link and microprocessor are located in the housing for receiving and processing weather data. A global locating device, such as a global positioning system (GPS) receiver, inputs a user's location into the microprocessor. The display receives data from the microprocessor that is representative of at least one graphical weather image. The graphical weather image indicates the location input from the global locating device and the weather data. The graphical weather image includes an area encompassing the user's location and a location marker representative of the user's location within that area. A system for displaying weather data includes the portable weather indicating device and one or more base stations positioned at different locations. The base stations receive weather data from various sources and send the information to the portable device. A method of displaying weather data is also disclosed.

21 Claims, 5 Drawing Sheets

PORTABLE WEATHER INDICATING DEVICE AND METHOD

BACKGROUND OF THE INVENTION

1. Technical Field

This invention relates to weather display systems and, more particularly, to a portable weather indicating device and method of displaying weather information thereon.

2. Background Art

Interest in weather-related events has dramatically increased during recent years with the advent of high-quality satellite and radar imaging systems, and their increased ability to accurately forecast future weather events. Hikers, bicyclists, campers, building contractors, and others are dependent on accurate weather forecasting and real-time weather information in planning and changing their outdoor activities. Currently, weather messages are continuously broadcasted through a special weather radio signal on the VHF band, ranging between 162.400 and 162.550 MHZ, which is outside the normal AM and FM broadcast bands. This special radio signal is provided by the National Oceanic and Atmospheric Administration (NOAA). Special weather radios must be used in order to receive these types of weather broadcasts. Weather messages are repeated every 4 to 6 minutes and are routinely updated every one to six hours, or more often when rapidly changing weather conditions are present. The weather broadcasts may also include severe weather warnings that pose a threat to life and safety.

Another type of weather warning system is provided by Data Transmission Network Corporation (DTN) of Omaha, Nebr. In this system, emergency weather information is sent directly to an alpha-numeric pager. Information such as weather watches, warnings and storm movement in a user's area, and local weather updates twice daily for an eight-county area, severe weather watches and warnings, dense fog advisories, winter storm watches and warnings, highway watches and warnings, freezing precipitation advisories, and avalanche bulletins are available in alpha-numeric format. In addition, an audible alarm may also be provided on the pager to signal certain weather events.

Although these systems provide severe weather warnings and local weather updates at recurring intervals, it is difficult for an end-user to determine his or her particular location with respect to weather events that may be occurring in surrounding areas without real-time or near real-time weather images. This difficulty is further augmented when the end-user is not sure of his or her geographical location. Without adequate resources to determine one's position with respect to storm paths or other weather events, many people may find themselves in difficult or even dangerous weather-related circumstances.

DISCLOSURE OF INVENTION

According to the present invention, a portable weather indicating device comprises a microprocessor; a communication link connected to the microprocessor for receiving weather data and transferring the weather data to the microprocessor; a global locating device, such as a global positioning system (GPS) receiver, connected to the microprocessor for inputting a user's location into the microprocessor; and a display connected to the microprocessor for displaying data received from the microprocessor that is representative of at least one graphical weather image. The graphical weather image includes the location input from the global locating device and the weather data. In one embodiment, the graphical weather image covers a representative area surrounding the user's location. Preferably, the graphical weather image also includes a geographical image that represents an area encompassing the user's location. A location marker or icon representative of the user's location within the geographical image is also preferably displayed. The location marker can be a dot, circle, square, "X", or any other graphical representation of a user's location with respect to the weather image. The portable weather indicating device of the present invention thus displays graphical weather data for a certain geographic area, along with the location of the portable weather indicating device within that geographic area to indicate the user's position with respect to the features on the weather display.

There are, of course, additional features of the invention that will be described hereinafter which will form the subject matter of the appended claims. Those skilled in the art will appreciate that the preferred embodiments may readily be used as a basis for designing other structures, methods and systems for carrying out the several purposes of the present invention. It is important, therefore, that the claims be regarded as including such equivalent constructions since they do not depart from the spirit and scope of the present invention. The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
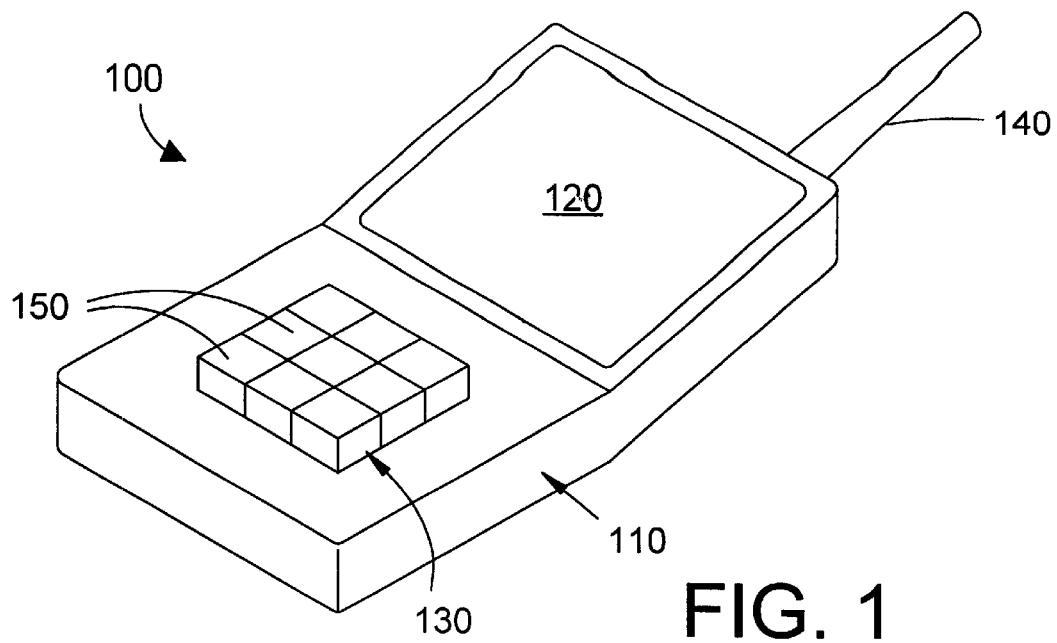
FIG. 1 is a perspective view of a portable weather indicating device according to a preferred embodiment of the invention.
Figure 2:
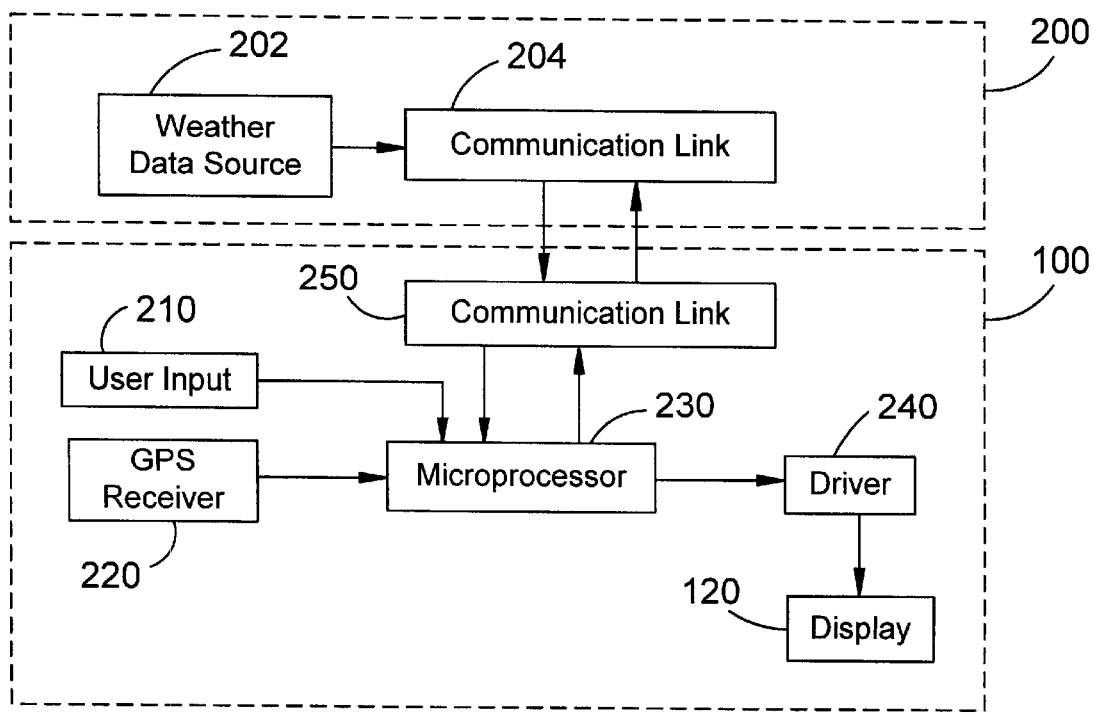
FIG. 2 is a block diagram schematic representation of a portable weather indicating device of the preferred embodiment.

Referring now to the drawings, and to FIGS. 1 and 2 in particular, a portable weather indicating device 100 includes a housing 110 that accommodates a display 120, a keypad 130, and an antenna 140. Referring to FIG. 2, device 100 includes a communication link 250 and a global positioning system (GPS) receiver 220, both of which are connected to a microprocessor 230. The microprocessor 230 is in turn connected to the display 120 through a display driver 240. In addition, the microprocessor 230 receives user input 210. The portable device 100 includes a power source, such as a battery, solar cell, or the like (not shown), for providing electrical power to the microprocessor 230 and other electronic components in the housing 110.

Display 120 is any suitable display that is capable of displaying weather information to a person, and is a means for displaying a graphical weather image. In the preferred embodiment, display 120 is a color liquid crystal display (LCD) that provides a color display of the weather image with low power requirements that allow the display to run for an extended period of time from a small power source, such as a battery. Driver 240 is a suitable display driver adapted to receive display information from the microprocessor and to display this information on the display 120. In the preferred embodiment, driver 240 is a color LCD driver that is matched to drive display 120.

GPS receiver 220 is a standard unit that determines the precise location of the GPS receiver 220 on the face of the earth. GPS receivers are well known in the art. The Global Positioning System is a system that allows a GPS receiver (such as GPS receiver 220 in FIG. 2) to communicate with several different GPS satellites to determine the location of the receiver in known coordinates, such as longitude and latitude. GPS receiver 220 thus includes means for determining its location, and the location data is input to the microprocessor 230. GPS receiver 220 is thus the means for the portable weather indicating device 100 to determine the position of the user with respect to the weather image. While the preferred embodiment includes a GPS receiver 220, note that any global location device that can generate the precise location of the device 100 is within the scope of the present invention, whether now existing or developed in the future.

Microprocessor 230 is any suitable microprocessor, microcontroller, or other processor that is capable of receiving user input 210, receiving location data from GPS receiver 220, transmitting and receiving data over communication link 250, and outputting display data to display driver 240. While microprocessor 230 is preferably a single-chip processor, microprocessor 230 also encompasses any number of integrated circuits and circuit boards working in cooperation to perform the functions of a processor. Microprocessor 230 is a means for processing weather data and geographical coordinates into one or more graphical weather images.

User input 210 represents any suitable input from the user of the portable weather indicating device 100. One example of user input 210 is for a user to press keys 150 on the keypad 130 of FIG. 1. Of course, many other types of user input fall within the scope of the present invention, including without limitation input from a pointing device, data input via a serial or parallel port, voice recognition, etc. Any means for a user to provide input to device 100 is within the scope of the present invention, whether the means exists today or is developed in the future.

Communication link 250 comprises any suitable means for transmitting information from the microprocessor 230 to a base station 200 and for receiving information from the base station 200. Note that communication link 250 may not need to transmit information to base station 200, but may operate as a receiver only as the system configuration dictates. Communication link 250 suitably includes appropriate transmitters and receivers, and may include one or more antennae (such as antenna 140 of FIG. 1), satellite dishes, or other mechanical or electrical apparatus for communicating between base station 200 and portable device 100.

In the preferred embodiment, the weather indicating device 100 is small enough to be held in a person's hand. However, the present invention expressly extends to any size of device 100 that is considered portable, whether by a person or by using any mechanical means of transportation.

Base station 200 includes a weather data source 202 that obtains real-time or near real-time weather data and a communication link 204 for transmitting weather data from the weather data source 202 to the communication link 250. Examples of weather data source 202 are discussed in more detail below. Communication link 204 is preferably a transmitter/receiver that is designed to communicate with communication link 250.

Data transfer between the communication links 204 and 250 may be accomplished via modem and cellular phone, frequency modulation, amplitude modulation, VHF, UHF, microwave circuitry, or other known means for transmitting information from one location to another. In one embodiment, the communication link 204 is a modem and the data source 202 is a website that obtains real-time weather data from radar signals, such as from the Next Generation Weather Radar (NEXRAD) or the like, satellite signals from NOAA satellite systems or the like, ground stations, or any other weather data source that may become available in the future.

Weather data provided by weather data source 202 can include, but is not limited to, Doppler radar, Doppler velocities, lightning strike and its relative ground position data, rain data including rain speed and direction at various altitudes, rain density, solar radiation, temperature, dew point, barometric pressure, wind speed, wind direction, humidity, or any other weather-related data. The data may also include information from the NOAA weather wire, such as tornado and severe weather watches and warnings, high wind watches and warnings, dense fog advisories, winter storm watches and warnings, freezing precipitation advisories, and avalanche bulletins. The displayed graphical weather image (FIG. 7) is preferably in the form of one or more radar images and/or satellite images and a superimposed image of a particular geographic area that is preferably centered at a user's location, as determined by the GPS receiver 220. The particular area to be displayed can be preset, or can be defined by a user through the keypad 130 or other input device. The keypad may include individual control buttons 150 for scrolling the superimposed images laterally and/or longitudinally, and for zooming the superimposed images in or out.

In a further embodiment, the base station 200 may include a processor that acquires and processes digital sensory imagery, commonly referred to as a Local User Terminal (LUT). The LUT may include a satellite antenna and its well-known related equipment, such as an outside low-noise-block down converter (LNB) and inside demodulators for downlinking and processing image data from one or more satellites that have previously been uplinked with data streams representative of several weather data sources, in order to receive weather information in real-time or near real-time. For example, weather imagery data is available under the NOAAPORT Broadcast System (NBS) and may currently be downlinked from the GTE SpaceNet IV Transponder 13. Such data may include information formatted into data streams from the NOAA GOES EAST and GOES WEST satellites, the National Centers for Environmental Prediction (NCEP)/National Weather Service Telecommunications Gateway (NWSTG), and the Non-GOES Data Collection Platform (DCP) imagery data. The GOES satellite data streams may include visible, infrared, and water vapor satellite image sets. The NCEP/NWSTG data stream may include field-generated text and observation data, upper air collective and profiler data, the nested grid model, the National Meteorological Center aviation model, the medium-range forecast model, Early Eta, MesoEta, rapid update cycle data, and manually generated nonmodel data. The Non-GOES imagery/DCP data stream may include selected satellite imagery from the European METEOSAT and Japanese GMS satellites.

When it is desirous to view only a limited number of the available weather images, the base station 200 can include a microprocessor or other processing device to receive, filter and process the desired data into proper image format for the display 120 before sending the image information to the portable weather indicating device 100. Alternatively, the base station 200 can directly send the data streams to the portable device 100 as they are obtained from NBS. In the latter case, filtering and data processing can be accomplished within the portable device 100.

Instead of a single base station 200 as depicted in FIG. 2, a plurality of base stations 200 may be provided at predefined localities across an area, city, county, state, country, continent, etc. The number of base stations could depend at least partially on the mode of transmitting the weather data from the base station 200 to the portable weather indicating device 100, as discussed above.

Figure 3:
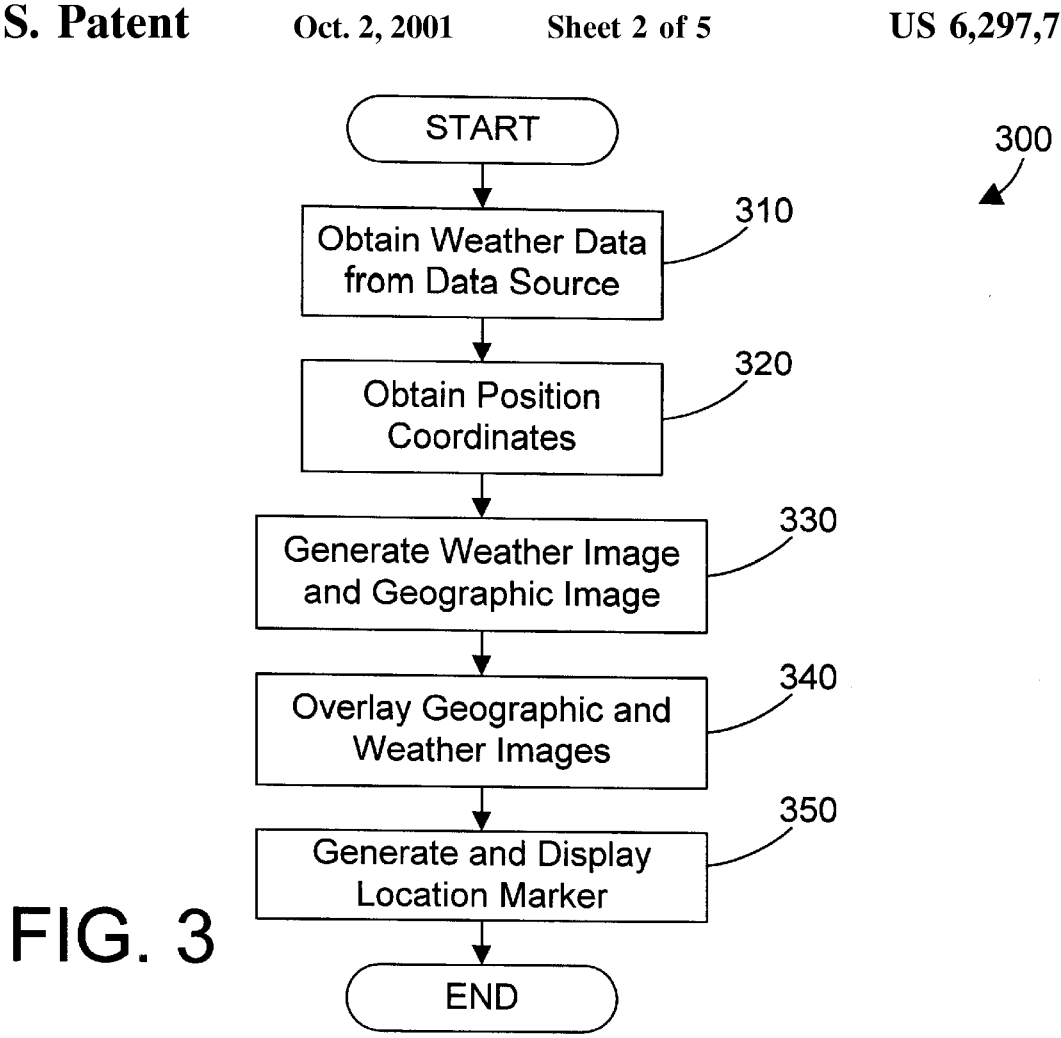
FIG. 3 is a flow diagram of a method for displaying weather image data according to a first embodiment of the invention.

Referring now to FIG. 3, a method 300 of receiving and displaying weather data on a weather indicating device 100 according to a first embodiment of the invention is illustrated. First, the weather indicating device 100 obtains weather data from the weather data source (step 310). In the preferred embodiment illustrated in FIG. 2, this step is accomplished by transmitting weather image data from the weather data source 202 in the base station 200 to the microprocessor 230 in the weather indicating device 100 via the communication links 204 and 250. Next, the weather indicating device 100 obtains position coordinates for its location (step 320). For the preferred embodiment of FIG. 2, the microprocessor 230 obtains the position data of device 100 from the GPS receiver 220. Transfer of weather data from the base station 200 to the weather indicating device 100 can occur automatically at discrete time intervals, but preferably occurs when the weather indicating device 100 contacts the base station and requests a new transmission of weather data. This is preferably accomplished by a user-initiated request signal, or alternatively at discrete time intervals when the weather indicating device 100 is powered up.

Communication means between the base station 200 and the weather indicating device 100 is preferably in the form of a cellular modem located in the device 100 that communicates with a modem located in the base station 200. However, other communication means in the electromagnetic spectrum, such as frequency modulation, amplitude modulation, VHF, UHF, microwave, and other communication methods and means, can be used. In the case where a plurality of base stations are used, the location or coordinates of each base station are preferably stored in memory in the weather indicating device 100, and the microprocessor 230 is programmed to locate the nearest base station with respect to the user's location or coordinates as determined by the GPS receiver 220, and then access that base station using communication link 250.

Figure 6:
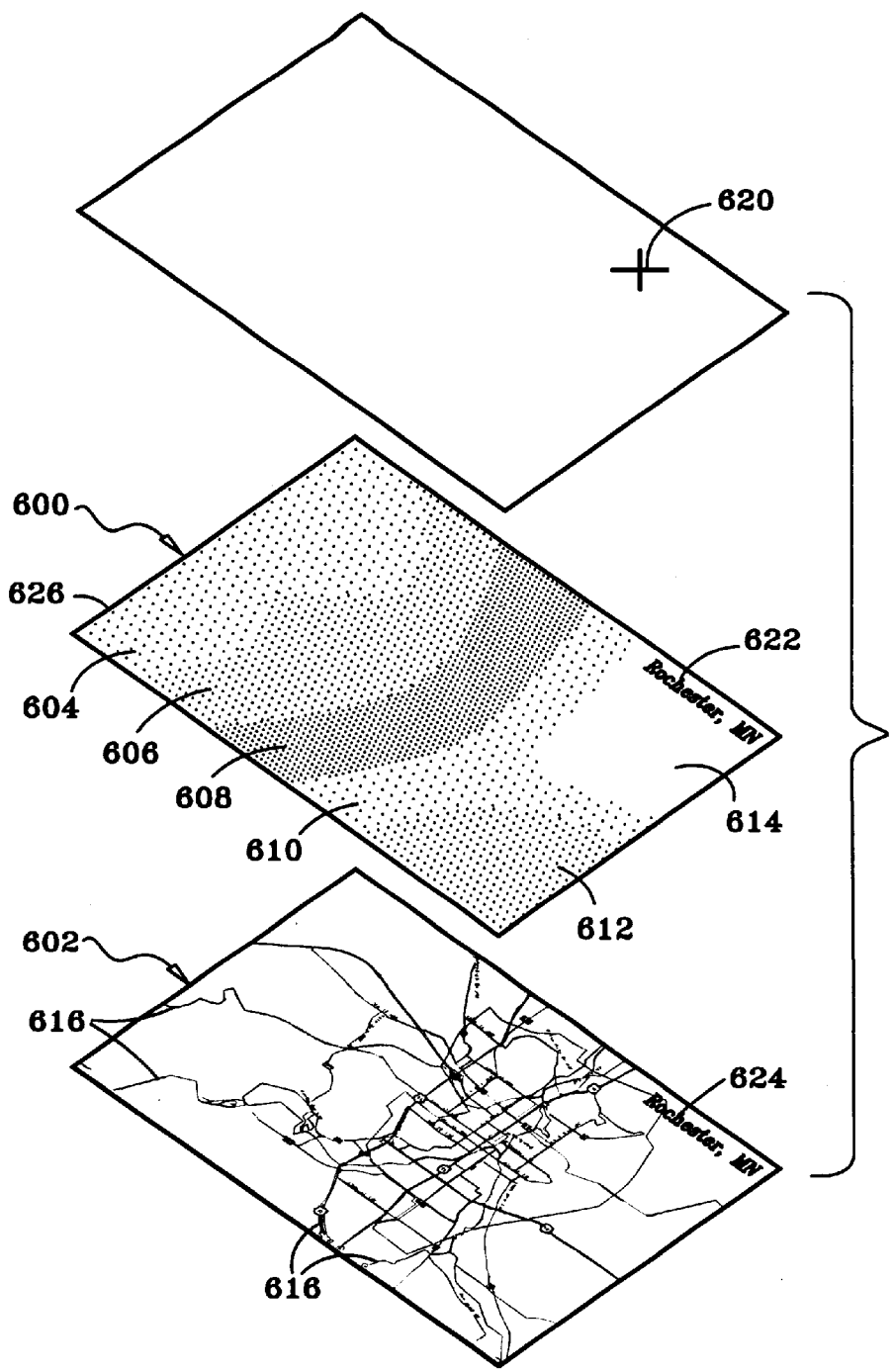
FIG. 6 is an exploded orthogonal view of a diagram showing the integration of a geographical image with a weather image and a location marker for display to a user of the portable weather indicating device of the preferred embodiments.
Figure 7:
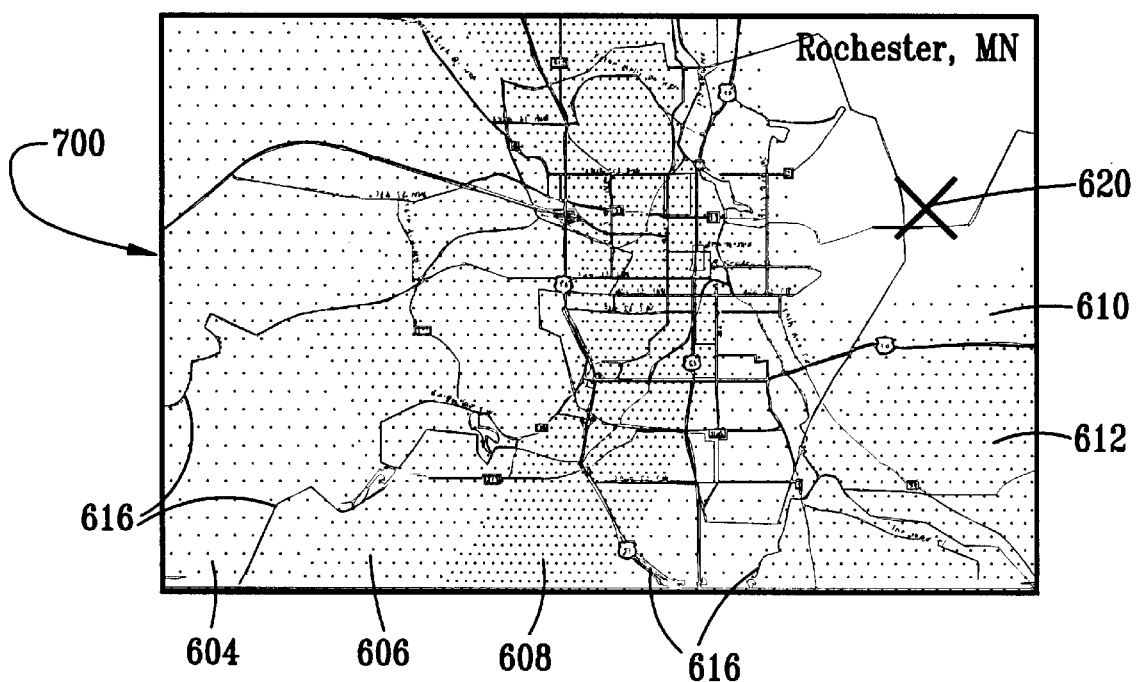
FIG. 7 is a top plan view of the images and location marker in FIG. 6 in a superimposed relationship.

Referring again to FIG. 3, with additional reference to FIGS. 6 and 7, after the weather indicating device 100 obtains the weather data from the base station 200, the weather data is processed by the microprocessor 230 to generate a weather image 600 and a geographic image 602 that is compatible with the display 120 (step 330). Suitable display formats include a bitmap or pixel image, or any other format for displaying graphical information on a display, whether currently known or developed in the future. The weather image 600, as shown by way of example in FIG. 6, may include different regions 604–612 representing areas of different weather conditions for the geographical area under consideration. The region 608 may for example, represent an area of high precipitation, the regions 606 and 612 may represent areas of medium precipitation, the regions 604 and 610 may represent areas of low precipitation, and the region 614 may represent an area of no precipitation. Although the weather image 600 comprises areas of precipitation in the foregoing example, it is to be understood that other weather image data associated with radar, satellite and other weather data collection devices as described above, may be displayed. The geographic image 602 preferably indicates roads 616, rivers, landmarks, or other natural or man-made geographical features, as shown in FIG. 6. The area covered by the geographical image should be a superset or a subset of the area covered by the displayed weather image in order to obtain an accurate representation of weather conditions in the local area.

The geographic image 602 is then merged with the weather image 600 to generate a geographical weather image 700 (FIG. 7) that includes weather data (step 340). The geographic image 602 may be part of the weather data stream received from the base station 200. Alternatively, the geographic image 602 may be stored as a portion of a regional or national map in a memory or storage that is accessible by the microprocessor and that may be recalled based on location information from the GPS receiver 220. Note that the weather data preferably includes geographic data that correlates the weather data to geographic points or areas, thereby providing the common reference points for overlaying the graphical and weather images in step 340.

Finally, a location marker or icon 620 (referred to generically herein as a "location marker") is generated on the display 120 and superimposed over the geographic image 602 and weather image 600 (step 350). The particular location of the marker on the display 120 is determined by position of the weather indicating device 100 as derived by the GPS receiver 220. With this arrangement, the user is immediately able to determine his or her position with respect to various weather conditions that are occurring either in or around the user's position. The location marker may be in the form of a dot, circle, square, "X", or any other suitable graphical representation that allows a user to visually identify his or her location on the display.

When data representing a large weather image area is downloaded into the weather indicating device 100, the ability to scroll and zoom in or out of a smaller image area without the necessity of further downloading is particularly advantageous.

Figure 4:
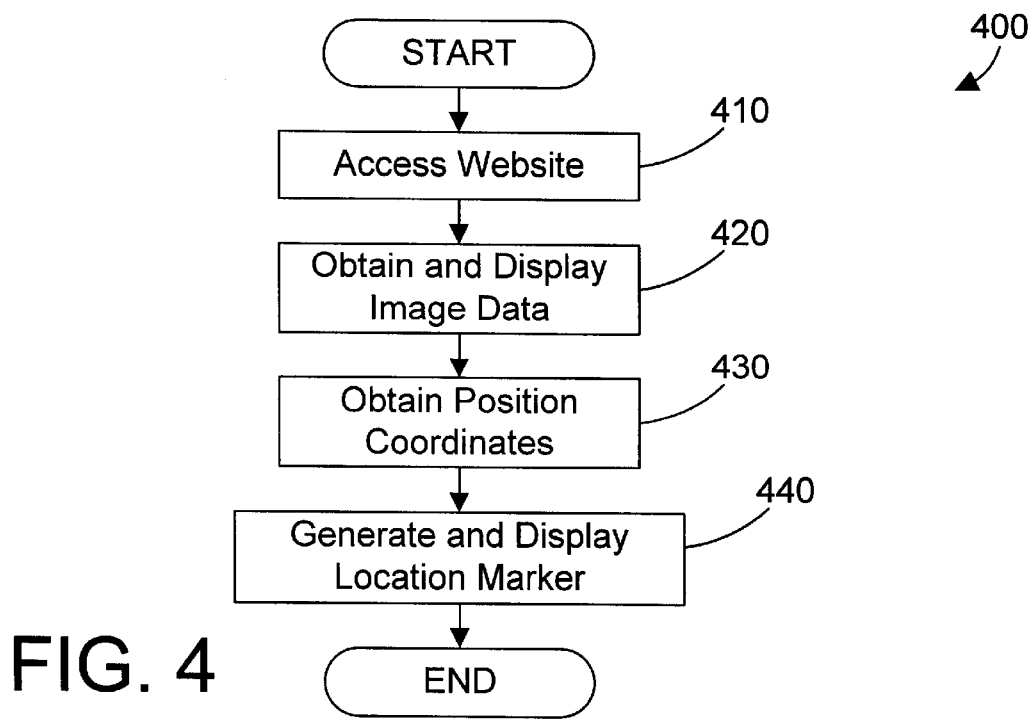
FIG. 4 is a flow diagram of a method for displaying weather image data according to a second embodiment of the invention.

Referring now to FIG. 4, a method 400 of receiving and displaying weather data on a portable weather indicating device 100 according to a second embodiment of the invention is illustrated. First, a website is accessed by the weather indicating device 100 (step 410). The website can be any of several currently available websites that specialize in providing weather data, or may be a dedicated website for the weather indicating device 100. Next, a suitable weather image is downloaded into the weather indicating device 100 (step 420), preferably in the form of a graphical interface file (.GIF file) that can be directly sent to the display 120. The user's location is then determined by the GPS receiver 220 (step 430). A location marker is then generated on the display 120 (step 440) at an appropriate location to indicate the user's position on the weather image.

Different methods may be used to correlate the weather image to a geographical area. For example, the weather image 600 may include geographical markers (not shown) such as cities, rivers, roads, and other prominent geographic points. One option is to process the weather image 600 to determine the geographic area that the weather image corresponds to. For example, if two or more known geographic points on the weather image 600 are found to correlate with geographic points on the geographic image 602, the weather image now has a geographic frame of reference that allows the location marker to be accurately placed on the display. Another option involves character recognition technology that could be used to process text 622 on the weather image 600 in an attempt to match the text 622 with other text 624 on the image 602 and/or geographic features stored in the memory of device 100. A further option is to transmit geographic information before or after the weather image, indicating the precise geographical metes and bounds for the particular image. As shown in FIG. 6, a frame 626 surrounding the weather image 600 defines the metes and bounds of that image. Once the weather image has a geographic frame of reference, the location marker 620 can be accurately placed on the display at a location that indicates to the user the user's position with respect to the weather data on the display.

In an alternate embodiment, a plurality of Internet addresses, commonly known as uniform resource locators or URLs, may be stored in a memory associated with microprocessor 230. Each URL may access weather data relating to a particular country, region, city, locality, etc. A user's location is first determined by the GPS receiver 220. Subsequently, the microprocessor 230 can determine the particular URL to be accessed based on the user's coordinates. The particular weather data associated with that URL can then be downloaded and displayed on the weather indicating device 100, along with a generated location marker.

The above-described procedure can also be used in the case where a plurality of base stations are positioned at different geographical locations. However, instead of storing Internet addresses in the microprocessor memory, the base station coordinates can be stored therein. Subsequently, the microprocessor 230 can determine the closest base station to be contacted by comparing the base station coordinates with the user's coordinates.

Figure 5:
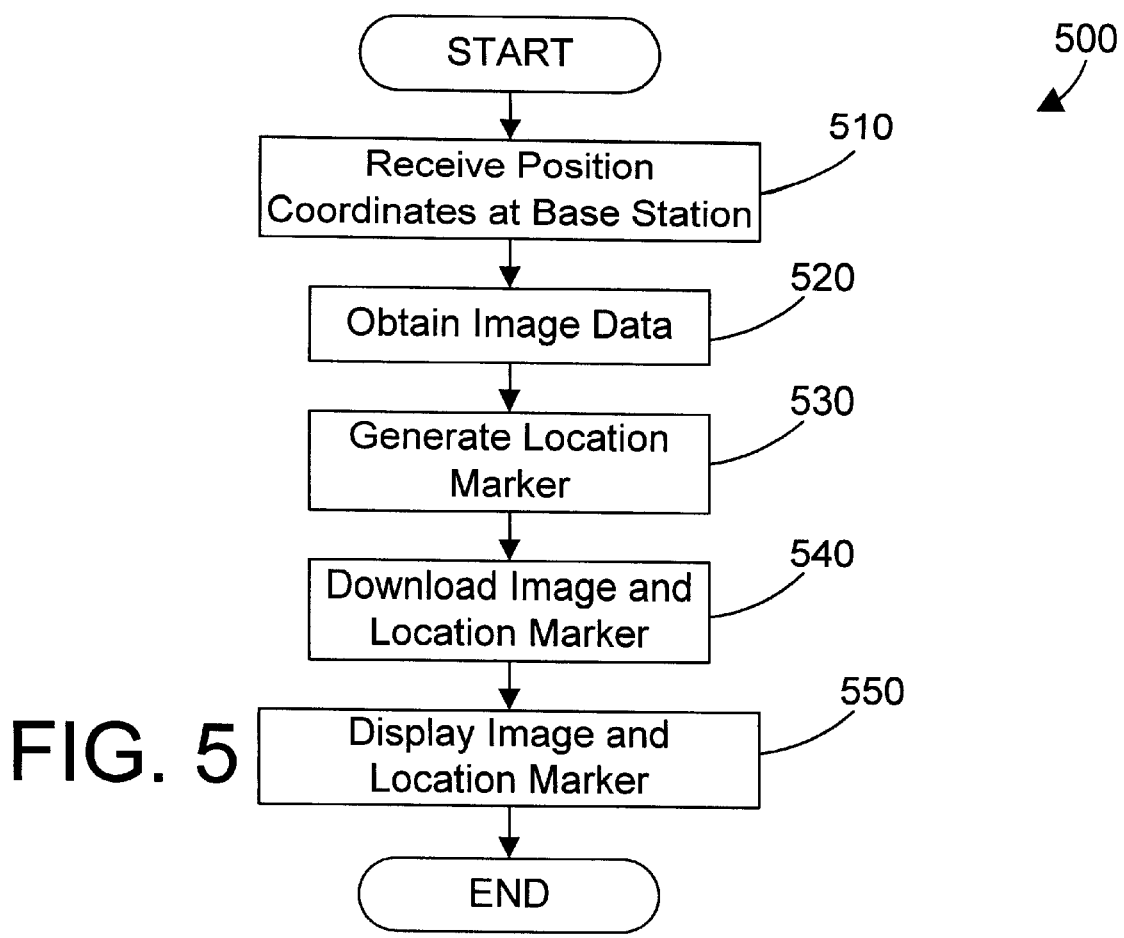
FIG. 5 is a flow diagram of a method for displaying weather image data according to a third embodiment of the invention.

Referring to FIG. 5, in yet a further embodiment, a dedicated base station 200 is programmed to receive coordinates of the user's position from device 100 (step 510). An appropriate weather image for downloading to the device 100 is then downloaded from the weather data source 202 (step 520), which is preferably a weather website. A location marker is then generated on the image based upon the received GPS coordinates at the website (step 530). Subsequently, the image and generated location marker are downloaded to the device 100 (step 540) and the weather image and location marker are then displayed (step 550). The type of weather data and images available at the website may be the same as previously described, and may be obtained in the same manner as previously described with respect to the base station 200. Thus, the base station 200 in this embodiment may include a satellite dish, a satellite receiver and other equipment to down link weather data and provide that data to the website for access by the device 100.

Although only a single weather indicating device 100 has been shown in relation to the above-described embodiments, it is to be understood that a plurality of weather indicating devices 100 can access one or more base stations 200.

Moreover, is to be understood that the weather data may be displayed in graphical form as either one or more stationary images or moving time-lapsed images. When the base station 200 includes a website, the time-lapsed images are preferably prepackaged .GIF files that can be displayed in sequence. If desired, weather forecasting information can also be included in the image data to show predicted weather movements in graphic form.

While the invention has been taught with specific reference to the above-described embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A portable weather indicating device, comprising:
   a processor;
   a wireless communication link coupled to the processor for receiving weather data from a source identified by at least one uniform resource locator (URL) accessible by the processor and for transferring the weather data to the processor;
   a global location device coupled to the processor for determining the location of the portable weather indicator;
   a display coupled to the processor, the display receiving data from the processor that includes at least one graphical weather image, the graphical weather image indicating: 1) the location of the portable weather indicator as determined from the global location device; and 2) a graphical representation of the weather data; and
   a housing that contains the processor, the wireless communication link, the global location device, and the display, the housing having dimensions that allow a person to hold the housing in one hand.

2. The portable weather indicating device of claim 1 wherein the graphical weather image corresponds to an area encompassing the location of the portable weather indicating device.

3. The portable weather indicating device of claim 1 wherein the graphical weather image includes a location marker representative of the location of the portable weather indicating device.

4. The portable weather indicating device of claim 1 wherein the graphical weather image includes at least one image selected from the group of satellite and radar images.

5. A weather indicating system comprising the portable weather indicating device of claim 1, and further comprising:
   a base station located remotely from the portable weather indicating device, the base station accessing the weather data and including a base communication link for delivering the weather data to the portable weather indicating device.

6. The weather indicating system of claim 5 wherein the base station includes at least one uniform resource locator (URL) accessible by the processor, and further wherein the wireless communication link of the portable weather indicating device includes a cellular modem for accessing the weather data from a source identified by the at least one URL.

7. The weather indicating system of claim 6 wherein the base station accesses a plurality of URLs, each URL referencing weather image information corresponding to a particular geographic area.

8. The weather indicating system of claim 7 further including logic for determining from which URL to access the weather data based on the location input from the global location device.

9. A portable weather indicating device, comprising:
   wireless means for receiving weather data from a source identified by at least one uniform resource locator (URL);
   location means for obtaining a user's geographical coordinates;
   means for processing the weather data and the geographical coordinates into at least one graphical weather image;
   means connected to the processing means for displaying the at least one graphical weather image, the graphical weather image corresponds to an area encompassing the user's geographical coordinates; and
   a housing that contains the means for receiving weather data, the means for processing, and the means for displaying, the housing having dimensions that allow a person to hold the housing in one hand.

10. The portable weather indicating device of claim 9 wherein the graphical weather image includes a location marker representative of the location of the portable weather indicating device.

11. The portable weather indicating device of claim 10 wherein the graphical weather image includes at least one image selected from the group of satellite and radar images.

12. A weather indicating system comprising the portable weather indicating device of claim 9, and further comprising:
   means for delivering the weather data to the portable weather indicating device, the means being located remotely from the portable weather indicating device.

13. The weather indicating system of claim 12 wherein the delivering means includes at least one uniform resource locator (URL) accessible by the processor, and further wherein the receiving means of the portable weather indicating device includes a cellular modem for accessing the weather data from a source identified by the at least one URL.

14. The weather indicating system of claim 13 wherein the delivering means includes a plurality of uniform resource locators (URLs), each URL referencing weather image information of a particular geographical area.

15. The weather indicating system of claim 14 wherein the portable weather indicating device includes means for determining from which URL to access the weather data based on location input from the location means.

16. A method of displaying weather data comprising the steps of:
   providing a hand held portable weather indicating device having a display;
   downloading weather data into the portable unit from at least one uniform resource locator (URL);
   obtaining geographical coordinates of the position of the hand held portable weather indicating device; and
   displaying a graphical weather image on the display from the weather data and the geographical coordinates, the graphical weather image corresponding to an area encompassing the position of the hand held portable weather indicating device.

17. The method of claim 16 wherein the step of generating a graphical weather image includes generating a location marker representative of the location of the portable weather indicating device.

18. The method of claim 17 wherein the step of receiving weather data includes receiving information selected from the group of satellite and radar image information.

19. The method of claim 16 wherein the step of receiving weather data includes downloading the weather data from at least one of a plurality of uniform resource locators (URLs), each URL referencing weather image information of a particular geographical area.

20. The method of claim 19 wherein the step of downloading the weather data includes determining from which URL to access the weather data based on the geographical coordinates of the portable unit.

21. The method of claim 16 and further comprising at least one base station having a satellite antenna for obtaining the weather data from a satellite, and wherein the step of receiving weather data in the portable unit includes receiving the weather data into the portable unit from the at least one base station.

* * * * *